(12) United States Patent
Kim et al.

(10) Patent No.: US 7,352,721 B2
(45) Date of Patent: Apr. 1, 2008

(54) BEAM FORMING APPARATUS AND METHOD FOR AN ARRAY ANTENNA SYSTEM

(75) Inventors: Byoung-Yun Kim, Suwon-si (KR); Song-Hun Kim, Suwon-si (KR); Katz Marcos Daniel, Suwon-si (KR); Seong-Ill Park, Seongnam-si (KR); Tobias Scholand, Duisburg (DE); Peter Jung, Duisburg (DE); Achim Seebens, Duisburg (DE); Ar jang H. A., Duisburg (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 11/123,235

(22) Filed: May 6, 2005

(65) Prior Publication Data

US 2005/0271016 A1    Dec. 8, 2005

(30) Foreign Application Priority Data

May 7, 2004    (KR)  ...................... 10-2004-0032409

(51) Int. Cl.
*H04Q 7/00* (2006.01)
*H04B 1/38* (2006.01)
*H04B 1/04* (2006.01)
*H04M 1/00* (2006.01)

(52) U.S. Cl. ................... 370/334; 455/561; 455/562.1; 455/110

(58) Field of Classification Search ................ 455/561, 455/562.1, 110; 370/334
See application file for complete search history.

(56) References Cited

U.S. PATENT DOCUMENTS

| | | | |
|---|---|---|---|
| 7,117,016 B2 * | 10/2006 | Kisigami et al. | ........ 455/562.1 |
| 7,239,893 B2 * | 7/2007 | Yang | ........................... 455/561 |
| 2006/0244660 A1 * | 11/2006 | Ann et al. | ................... 342/377 |

* cited by examiner

*Primary Examiner*—Barry Taylor
(74) *Attorney, Agent, or Firm*—Roylance, Abrams, Berdo & Goodman L.L.P.

(57) ABSTRACT

A joint channel and Direction of Arrival (DOA) estimation apparatus and method simplified to efficiently estimate a channel impulse response associated with a spatially selective transmission channel occurring in a mobile radio channel are provided. To uniformly process all directions, angles associated with a beam are predetermined according to a preset method. This selection calculates a linear system model with regular spatial sampling using regular spatial separation of beam angles. The novel beam forming compensates for a difference between an adaptive array antenna and a sector type antenna using appropriate beam steering according to the calculated linear system model, thereby improving performance and facilitating implementation.

16 Claims, 9 Drawing Sheets

BEAM FORMING APPARATUS AND METHOD FOR AN ARRAY ANTENNA SYSTEM

PRIORITY

This application claims priority under 35 U.S.C. § 119(a) to an application entitled "Beam Forming Apparatus and Method for an Array Antenna System" filed in the Korean Intellectual Property Office on May 7, 2004 and assigned Serial No. 2004-32409, the entire contents of which are incorporated herein by reference.

BACKGROUND OF THE INVENTION

1. Field of the Invention

The present invention relates generally to an array antenna system. In particular, the present invention relates to an apparatus and method for optimal beam forming for transmitting and receiving high-speed data.

2. Description of the Related Art

Reception quality of radio signals is affected by many natural phenomena. One of the natural phenomena is temporal dispersion caused by signals reflected on obstacles in different positions in a propagation path before the signals arrive at a receiver. With the introduction of digital coding in a wireless system, a temporally dispersion signal can be successfully restored using a Rake receiver or equalizer.

Another phenomenon called fast fading or Rayleigh fading is spatial dispersion caused by signals which are dispersed in a propagation path by an object located a short distance from a transmitter or a receiver. If signals received through different spaces, i.e., spatial signals, are combined in an inappropriate phase region, the sum of the received signals is very low in intensity, approaching zero. This becomes a cause of fading dips where received signals substantially disappear, and the fading dips frequently occur when a length corresponds to a wavelength.

A known method of removing fading is to provide an antenna diversity system to a receiver. The antenna diversity system includes two or more spatially separated reception antennas. Signals received by the respective antennas have low relation in fading, reducing the possibility that the two antennas will simultaneously generate the fading dips.

Another phenomenon that significantly affects radio transmission is interference. The interference is defined as an undesired signal received on a desired signal channel. In a cellular radio system, the interference is directly related to a requirement of communication capacity. Because radio spectrum is a limited resource, a radio frequency band given to a cellular operator should be efficiently used.

Due to the spread of cellular systems, research is being conducted on an array antenna structure connected to a beam former (BF) as a new scheme for increasing traffic capacity by removing an influence of the interference and fading. Each antenna element forms a set of antenna beams. A signal transmitted from a transmitter is received by each of the antenna beams, and spatial signals experiencing different spatial channels are maintained by individual angular information. The angular information is determined according to a phase difference between different signals. Direction estimation of a signal source is achieved by demodulating a received signal. A direction of a signal source is also called a "Direction of Arrival (DOA)."

Estimation of DOAs is used to select an antenna beam for signal transmission to a desired direction or steer an antenna beam in a direction where a desired signal is received. A beam former estimates steering vectors and DOAs for simultaneously detected multiple spatial signals, and determines beam-forming weight vectors from a set of the steering vectors. The beam-forming weight vectors are used for restoring signals. Algorithms used for beam forming include Multiple Signal Classification (MUSIC), Estimation of Signal Parameters via Rotational Invariance Techniques (ESPRIT), Weighted Subspace Fitting (WSF), and Method of Direction Estimation (MODE).

An adaptive beam forming process depends upon having correct information on spatial channels. Therefore, adaptive beam forming can be acquired only after estimation of the spatial channels. This estimation should consider not only temporal dispersion of channels but also DOAs of radio waves received at a reception antenna.

For estimation of spatial channels, a reception side requires the arrangement of an array antenna having $K_a$ antenna elements. Such an array antenna serves as a spatial low-pass filter having a finite spatial resolution. The term "spatial low-pass filtering" refers to an operation of dividing an incident wave (or impinging wave) of an array antenna into spatial signals that pass through different spatial regions. A receiver having the foregoing array antenna combines a finite number, $N_b$, of spatial signals, for beam forming. As described above, the best possible beam forming requires information on DOAs and a temporally dispersed channel's impulse response for the DOAs. A value of the $N_b$ cannot be greater than a value of the $K_a$, and thus represents the number of resolvable spatial signals. The maximum value, $max(N_b)$, of the $N_b$ is fixed according to a structure of the array antenna.

FIG. 1 illustrates an example of a base station (or a Node B) with an array antenna, which communicates with a plurality of mobile stations (or user equipments). Referring to FIG. 1, a base station 115 has an array antenna 110 comprised of 4 antenna elements. The base station 115 has 5 users A, B, C, D and E located in its coverage. A receiver 100 selects signals from desired users from among the 5 users, by beam forming. Because the array antenna 110 of FIG. 1 has only 4 antenna elements, the receiver 100 restores signals from a maximum of 4 users, e.g., signals from users A, B, D and E as illustrated, by beam forming.

FIG. 2 illustrates spatial characteristics of beam forming for selecting a signal from a user A, by way of example. As illustrated, if a very high weight, or gain, is applied to a signal from a user A, a gain approximating zero is applied to signals from the other users.

In an antenna diversity system using an array antenna, resolvable beams are associated with DOAs of $max(N_b)$ maximum incident waves. Actually, the total number of incident waves is much greater than $max(N_b)$, and is subject to change according to a mobile environment. In order to achieve beam forming, a receiver should acquire information on DOAs, and the acquisition of DOA information can be achieved through DOA estimation. However, estimated DOAs are not regularly spaced apart from each other. Therefore, in a digital receiver, conventional beam forming includes irregular spatial samplings. A final goal of beam forming is to separate an incident wave so as to fully use spatial diversity in order to suppress fading. However, its latent faculty is limited by the structure of an array antenna having a finite spatial resolution.

In the conventional beam-forming methods, differentiation between spatially selective transmission channels for radio mobile communication includes three separate steps a first step of estimating spatial channels, a second step of estimating DOAs based on the estimated spatial channels, and a third step of estimating a spatial and temporal channel impulse characteristic for a beam forming algorithm using the estimated spatial channels and the estimated DOAs. This 3-step method has a heavy implementation load and causes considerable signal processing cost in operation and a lack of robustness due to estimation errors.

SUMMARY OF THE INVENTION

It is, therefore, an object of the present invention to simply implement analog and digital front ends of a radio communication system by calculating a linear system model using regular spatial samplings.

It is another object of the present invention to provide an apparatus and method for efficiently estimating a spatially selective transmission channel's impulse response in a mobile radio channel needed for transmitting transmission data at a possible minimum bit error rate (BER) or with possible maximum throughput.

According to one aspect of the present invention, there is provided a beam forming apparatus for an antenna diversity system with an array antenna having a plurality of antenna elements. The apparatus comprises an interference and noise calculator for estimating interference power $R_{DOA}$ and spectral noise density $N_0$ of a radio channel using a signal received through the radio channel, and calculating total noise power of the radio channel according to the interference power and the spectral noise density; a channel estimator for calculating a directional channel impulse response matrix corresponding to a predetermined number of direction-of-arrival (DOA) values using the total noise power, and combining a phase matrix comprising phase factors associated with the DOA values with the directional channel impulse response matrix to calculate a combined channel impulse response; and a beam former for performing beam forming for transmission and reception through the array antenna using the combined channel impulse response.

According to another aspect of the present invention, there is provided a beam forming method for an antenna diversity system with an array antenna having a plurality of antenna elements. The method comprises the steps of estimating interference power $R_{DOA}$ and spectral noise density $N_0$ of a radio channel using a signal received through the radio channel, and calculating total noise power of the radio channel according to the interference power and the spectral noise density; calculating a directional channel impulse response matrix corresponding to a predetermined number of direction-of-arrival (DOA) values using the total noise power, and combining a phase matrix including phase factors associated with the DOA values with the directional channel impulse response matrix to calculate a combined channel impulse response; and performing beam forming for transmission and reception through the array antenna using the combined channel impulse response.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
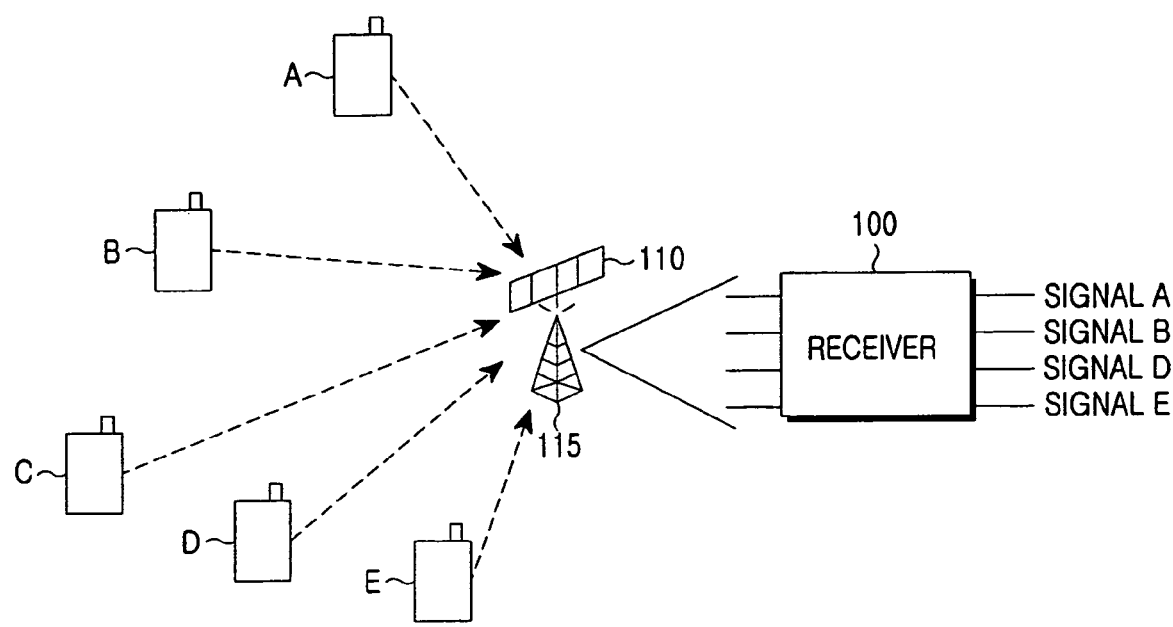
FIG. 1 illustrates an example of a conventional base station with an array antenna, which communicates with a plurality of mobile stations.
Figure 2:
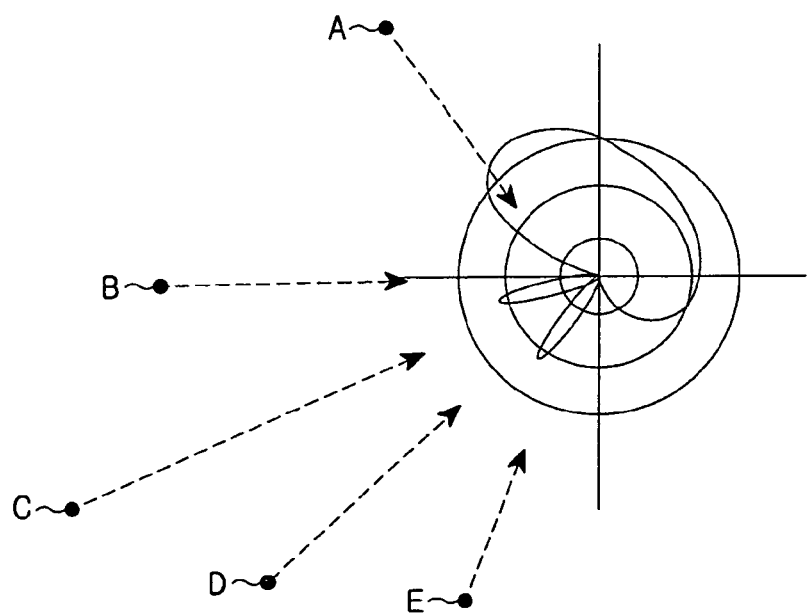
FIG. 2 is a polar plot illustrating conventional spatial characteristics of beam forming for selecting a signal from one user.

Several embodiments of the present invention will now be described in detail with reference to the accompanying drawings. In the following description, a detailed description of known functions and configurations incorporated herein has been omitted for conciseness.

The present invention described below does not consider DOAs of maximum incident waves that need irregular spatial sampling, in performing beam forming by estimating spatial channels in an antenna diversity system. The irregular spatial sampling requires accurate time measurement and time-varying reconstruction filtering, and is more complex than a regular sampling strategy in implementation. Therefore, the present invention pre-calculates a linear system model beginning at regular spatial sampling that uses regular spatial separation for a beam angle, thereby dramatically the reducing complexity of channel estimation.

The conventional beam forming comprises a first step of estimating spatial channels, a second step of estimating DOAs based on the estimated spatial channels, and a third step of estimating a spatial and temporal channel impulse characteristic for a beam forming algorithm using the estimated spatial channels and the estimated DOAs. In contrast, the present invention simplifies the beam forming with only the third step by removing the first and second steps that require a large number of calculations. Therefore, spatial and temporal channel and DOA estimation that uses, for example, a maximum likelihood (ML) selection scheme is possible.

A system model applied to the present invention will first be described.

A burst transmission frame of a radio communication system has bursts including two data transport parts (also known as sub-frames) each comprised of N data symbols. Mid-ambles which are training sequences predefined between a transmitter and a receiver, having $L_m$ chips, are included in each data carrying part so that channel characteristics and interferences in a radio section can be measured. The radio communication system supports multiple access based on Transmit Diversity Code Division Multiple Access (TD-CDMA), and spreads each data symbol using a Q-chip Orthogonal Variable Spreading Factor (OVSF) code which is a user specific CDMA code. In a radio environment, there are K users per cell and frequency band, and per time slot. As a whole, there are $K_i$ inter-cell interferences.

A base station (or a Node B) uses an array antenna having $K_a$ antenna elements. Assuming that a signal transmitted by a $k^{th}$ user (k=1, ..., K) is incident upon (impinges on) the array antenna in $k_d^{(d)}$ different directions, each of the directions is represented by a cardinal identifier $k_d$ ($k_d$=1, ..., $K_d^{(d)}$). Then, a phase factor of a $k_d^{th}$ spatial signal which is incident upon the array antenna from a $k^{th}$ user (i.e., a user #k) through a $k_a^{th}$ antenna element (i.e., an antenna element $k_a$ ($k_a$=1, ..., $K_a$)) is defined as $$\Psi(k, k_a, k_d) = 2\pi \frac{l^{(k_a)}}{\lambda} \cdot \cos(\beta^{(k,k_d)} - \alpha^{(k_a)}) \quad (1)$$

In Equation (1), $\alpha^{(k_a)}$ denotes an angle between a virtual line connecting antenna elements arranged in a predetermined distance from each other to a predetermined antenna array reference point and a predetermined reference line passing through the antenna array reference point, and its value is previously known to a receiver according to a structure of the array antenna. In addition, $\beta^{(k,k_d)}$ denotes a DOA in radians, representing a direction of a $k_d^{th}$ spatial signal arriving from a user #k on the basis of the reference line, $\lambda$ denotes a wavelength of a carrier frequency, and $l^{(k_a)}$ denotes a distance between a $k_a^{th}$ antenna element and the antenna array reference point.

For each DOA $\beta^{(k,k_a)}$ of a desired signal associated with a user #k, a unique channel impulse response observable by a virtual unidirectional antenna located in the reference point is expressed by a directional channel impulse response vector of Equation (2) below representing W path channels.

$$\underline{h}_d^{(k,k_d)} = (h_{d,1}^{k,k_d}, h_{d,2}^{(k,k_d)}, \ldots, h_{d,W}^{(k,k_d)})^T \quad (2)$$

where a superscript 'T' denotes transpose of a matrix or a vector, and an underline indicates a matrix or a vector.

For each antenna element $k_a$, W path channels associated with each of a total of K users are measured. Using Equation (1) and Equation (2), it is possible to calculate a discrete-time channel impulse response representative of a channel characteristic for an antenna $k_a$ for a user #k as shown in Equation (3).

$$\underline{h}^{(k,k_a)} = \quad (3)$$
$$(\underline{h}_1^{(k,k_a)}, \underline{h}_2^{(k,k_a)}, \ldots, \underline{h}_W^{(k,k_a)})^T = \sum_{k_d=1}^{K_d^k} \exp\{j\Psi(k, k_a, k_d)\} \cdot \underline{h}_d^{(k,k_d)},$$
$$k = 1\ldots K, k_a = 1\ldots K_a$$

In Equation (3), $\underline{h}^{(k,k_d)}$ denotes a vector representing a discrete-time channel impulse response characteristic for a $k^{th}$ spatial direction, from a user #k. Herein, the vector indicates that the channel impulse response characteristic comprises directional channel impulse response characteristics $\underline{h}_1^{(k,k_d)}, \underline{h}_2^{(k,k_d)}, \ldots, \underline{h}_W^{(k,k_d)}$ for W spatial channels. The directional channel impulse response characteristics are associated with the DOAs illustrated in Equation (1).

Using a directional channel impulse response vector of Equation (5) below that uses a W×(W·$K_d^{(k)}$) phase matrix illustrated in Equation (4) below including a phase factor $\Psi$ associated with a user #k and an antenna element $k_a$ and comprises all directional impulse response vectors associated with the user #k, Equation (3) is rewritten as Equation (6).

$$\underline{A}_s^{(k,k_a)} = (e^{j\Psi(k,k_a,1)}I_W, e^{j\Psi(k,k_a,2)}I_W, \ldots, e^{j\Psi(k,k_a,K_d^{(k)})}I_W),$$
$$k=1\ldots K, k_a=1\ldots K_a \quad (4)$$

where $\underline{A}_s^{(k,k_a)}$ denotes a phase vector for $K_d^{(d)}$ directions for a user #k, and $I_W$ denotes a W×W identity matrix.

$$\underline{h}_d^{(k)} = (\underline{h}_d^{(k,1)T}, \underline{h}_d^{(k,2)T}, \ldots, \underline{h}_d^{(k,K_d^{(k)})T})^T, k=1\ldots K \quad (5)$$

$$\underline{h}^{(k,k_a)} = \underline{A}_s^{(k,k_a)}\underline{h}_d^{(k)}, k=1\ldots K, k_a=1\ldots K_a \quad (6)$$

Using a channel impulse response of Equation (6) associated with a user #k, a channel impulse response vector comprised of K·W elements for an antenna element $k_a$ for all of K users is written as $$\underline{h}^{(k_a)} = ((\underline{A}_s^{(1,k_a)}\underline{h}_d^{(1)})^T, (\underline{A}_s^{(2,k_a)}\underline{h}_d^{(2)})^T, \ldots, (\underline{A}_s^{(K,k_a)}\underline{h}_d^{(K)})^T)^T, k_a=1\ldots K_a \quad (7)$$

A directional channel impulse response vector having K·W·$K^{d(k)}$ elements is defined as $$\underline{h}_d = (\underline{h}_d^{(1)T}, \underline{h}_d^{(2)T}, \ldots, \underline{h}_d^{(K)T})^T \quad (8)$$

where $\underline{h}_d^{(k)}$ denotes a directional channel impulse response vector for a user #k.

Equation (9) below expresses a phase matrix $\underline{A}_s^{(k_a)}$ for all of K users for an antenna element $k_a$ as a set of phase matrixes for each user.

$$\underline{A}_s^{(k_a)} = \begin{bmatrix} \underline{A}_s^{(1,k_a)} & 0 & A & 0 \\ 0 & \underline{A}_s^{(2,k_a)} & A & 0 \\ M & M & O & \\ 0 & 0 & A & \underline{A}_s^{(K,k_a)} \end{bmatrix}, k_a=1\ldots K_a \quad (9)$$

In Equation (9), '0' denotes a W×(W·$K_d^{(k)}$) all-zero matrix, and the phase matrix $\underline{A}_s^{(k_a)}$ has a size of (K·W)×(K·W·$K_d^{(k)}$). Then, for Equation (7), a channel impulse response vector for all of $K_d^{(k)}$ signals for all of K users at an antenna element $k_a$ can be calculated by $$\underline{h}^{(k_a)} = \underline{A}_s^{(k_a)}\underline{h}_d, k_a=1\ldots K_a \quad (10)$$

Using Equation (10), a combined channel impulse response vector having K·W·$K_a$ elements is written as $$\underline{h} = (\underline{h}^{(1)T}, \underline{h}^{(2)T}, \ldots, \underline{h}^{(K_a)T})^T \quad (11)$$

That is, a phase matrix $\underline{A}_s$ for which all of $K_d^{(k)}$ spatial signals for all of K users for all of $K_a$ antenna elements are taken into consideration is defined as Equation (12), and a combined channel impulse response vector $\underline{h}$ is calculated by a phase matrix and a directional channel impulse response vector as shown in Equation (13).

$$\underline{A}_s = (\underline{A}_s^{(1)T}, \underline{A}_s^{(2)T}, \ldots, \underline{A}_s^{(K_a)T})^T \quad (12)$$

$$\underline{h} = \underline{A}_s\underline{h}_d \quad (13)$$

The matrix $\underline{A}_s$, as described above, is calculated using $\beta^{(k,k_d)}$ representative of DOAs for the spatial signals for each user.

The directional channel impulse response vector $\underline{h}_d$ comprises an influence of interference power and noises. The possible number of interferences incident upon a receiver is expressed as $$L = L_m - W + 1 \quad (14)$$

where $L_m$ denotes a length of a mid-amble as described above, and W denotes the number of path channels.

A user specific mid-amble training sequence known between a transmitter and a receiver is comprised of L×KW Toeplitz matrixes $\underline{G}^{(k)}$ representing mid-amble sequences for a user #k.

$$\underline{G} = (\underline{G}^{(1)}, \underline{G}^{(2)}, \ldots, \underline{G}^{(K)}) \quad (15)$$

A reception signal vector associated with a mid-amble, received from an antenna element $k_a$, is expressed as $$\underline{e}^{(k_a)} = \underline{G}\underline{h}^{(k_a)} + \underline{n}^{(k_a)}, k_a = 1 \ldots K_a \quad (16)$$

In Equation (16), $\underline{n}^{(k_a)}$ denotes the total noise vector comprised of a universal interference and a thermal noise at an antenna element $k_a$, and is comprised of L elements. Then, a $K_a \times L$ combined noise vector $\underline{n}$ representing L noises affecting all of the $K_a$ antenna elements is expressed as $$\underline{n} = (\underline{n}^{(1)T}, \underline{n}^{(2)T}, \ldots, \underline{n}^{(K_a)T})^T \quad (17)$$

Actually, however, only $K_i$ interference signals having the highest intensity among a total of L noises are taken into consideration. Herein, $K_i$ is predetermined according to the system capacity. Assuming that an angle between the reference line and an incident direction estimated for a $k_i^{th}$ interference signal among Ki interference signals is defined as an incident angle $\gamma^{(k_i)}$ of the corresponding interference signal, a phase factor of a $k_i^{th}$ interference signal incident upon a $k_a^{th}$ antenna element is written as $$\Phi(k_i, k_a) = 2\pi \frac{l^{(k_a)}}{\lambda^*} \cdot \cos(\gamma^{(k_i)} - \alpha^{(k_a)}), \quad k_i = 1 \ldots K_i, k_a = 1 \ldots K_a \quad (18)$$

Assuming that a reception vector associated with an interference signal $k_i$ is defined as $\underline{n}_i^{(k_i)}$, a noise vector $\underline{n}^{(k_a)}$ for a $k_a^{th}$ antenna element becomes $$\underline{n}^{(k_a)} = \sum_{k_i=1}^{k_i} e^{j\Phi(k_i, k_a)} \underline{n}_i^{(k_i)} + \underline{n}_{th}^{(k_a)}, k_a = 1 \ldots K_a \quad (19)$$

In Equation (19), a vector $\underline{n}_{th}^{(k_a)}$ denotes a thermal noise measured at an antenna element $k_a$ having a double-sided spectral noise density $N_0/2$, a lower-case letter 'e' denotes an exponential function of a natural logarithm, and $N_0$ denotes spectral noise density.

However, because of spectrum forming by modulation and filtering, a measured thermal noise is generally a non-white noise. The non-white noise has a thermal noise covariance matrix having a normalized temporal covariance matrix $\underline{R}_{th}$ of a colored noise as shown in Equation (20).

$$\underline{R}_{th} = N_0 \tilde{\underline{R}}_{th} \quad (20)$$

In Equation (20), '~(tilde)' indicates an estimated value, and a description thereof will be omitted herein for convenience. If a Kronecker symbol shown in Equation (21) below is used, an L×L covariance matrix $\underline{R}_n^{(u,v)}$ meaning noise power between an $u^{th}$ antenna element and a $v^{th}$ antenna element is written as Equation (22). Herein, u and v each are a natural number between 1 and $k_a$.

$$\delta_{uv} = \begin{cases} 1 & u = v \\ 0 & \text{else} \end{cases} \quad (21)$$

$$\begin{aligned} \underline{R}_n^{(u,v)} &= E\{\underline{n}^{(u)} \underline{n}^{(v)H}\} \quad (22) \\ &= E\left\{\left(\sum_{k_i=1}^{K_i} e^{j\Phi(k_i,u)} \underline{n}_i^{(k_i)} + \underline{n}_{th}^{(u)}\right)\left(\sum_{k_i=1}^{K_i} e^{j\Phi(k_i,v)} \underline{n}_i^{(k_i)} + \underline{n}_{th}^{(v)}\right)^H\right\} \\ &= E\left[\left(\sum_{k_i=1}^{K_i} e^{j\Phi(k_i,u) - j\Phi(k_i,v)} \underline{n}_i^{(k_i)} \underline{n}_i^{(k_i)H}\right)\right] + E\{\underline{n}_{th}^{(u)} \underline{n}_{th}^{(v)H}\} \\ &= \sum_{k_i=1}^{K_i} e^{j\Phi(k_i,u) - j\Phi(k_i,v)} E\{\underline{n}_i^{(k_i)} \underline{n}_i^{(k_i)H}\} + \delta_{uv} N_0 \tilde{\underline{R}}_{th}, \\ u, v &= 1 \ldots K_a \end{aligned}$$

In Equation (22), $E\{\cdot\}$ denotes a function for calculating energy, and a superscript 'H' denotes Hermitian transform of a matrix or a vector. Assuming in Equation (22) that interference signals of different antenna elements have no spatial correlation and there is no correlation between interferences and thermal noises, Equation (23) is given. Therefore, in accordance with Equation (23), energy of a $k_i^{th}$ interference signal can be calculated using power of the $k_i^{th}$ interference signal.

$$E\{\underline{n}_i^{(k_i)} \underline{n}_i^{(k_i)H}\} = (\sigma^{(k_i)})^2 \cdot \tilde{\underline{R}} \quad (23)$$

In Equation (23), $\{\sigma^{(k_i)}\}^2$ denotes power of a $k_i^{th}$ interference signal. The L×L normalized temporal covariance matrix $\underline{R}$ is constant for all of $K_i$ interferences and represents a spectral form of an interference signal, and its value is known to a receiver. The $\underline{R}$ is a matrix for calculating correlations between interference signals, and between the interference signals and other interference signals. The correlations are determined according to whether relationship between the interference signals are independent or dependent. If there is a high probability that when one interference signal A occurs another interference signal B will occur, a correlation between the two interference signals is high. In contrast, if there is no relationship between generations of the two interference signals, a correlation between the two interference signals is low. Therefore, if there is no correlation between interference signals, i.e., if the interference signals are independent, $\tilde{\underline{R}}$ has a form of a unit matrix in which all elements except diagonal elements are 0s. That is, $\underline{R}_{th}$ and $\underline{R}$ are approximately equal to each other as shown in Equation (24) below.

$$\tilde{\underline{R}} \approx \tilde{\underline{R}}_{th} \approx I_L \quad (24)$$

In Equation (24), $I_L$ denotes an L×L identity matrix. Thus, Equation (22) can be simplified as $$\begin{aligned} \underline{R}_n^{(u,v)} &= \tilde{\underline{R}} \cdot \sum_{k_i=1}^{K_i} (\sigma^{(k_i)})^2 e^{j\Phi(k_i,u) - j\Phi(k_i,v)} + \delta_{uv} N_0 \tilde{\underline{R}}_{th} \quad (25) \\ &= r_{u,v} \tilde{\underline{R}} + \delta_{uv} N_0 \tilde{\underline{R}}_{th} \\ &\approx (r_{u,v} + \delta_{uv} N_0) I_L, u, v = 1 \ldots K_a \end{aligned}$$

A vector $r_{u,v}$ is an interference signal between an antenna element 'u' and an antenna element 'v', defined by Equation (25) itself.

Using Equation (25), an $LK_a \times LK_a$ covariance matrix of a combined noise vector $\underline{n}$ defined in Equation (17) is expressed as $$\underline{R}_n = \begin{bmatrix} \underline{r}_{1,1} & \underline{r}_{1,2} & \cdots & \underline{r}_{1,K_a} \\ \underline{r}_{2,1} & \underline{r}_{2,2} & \cdots & \underline{r}_{2,K_a} \\ \vdots & \vdots & \ddots & \vdots \\ \underline{r}_{K_a,1} & \underline{r}_{K_a,2} & \cdots & \underline{r}_{K_a,K_a} \end{bmatrix} \otimes \tilde{\underline{R}} + N_0 I_{K_a} \otimes \tilde{\underline{R}}_{th} \quad (26)$$

$$= R_{DOA} \otimes \tilde{\underline{R}} + N_0 I_{K_a} \otimes \tilde{\underline{R}}_{th}$$

$$\approx [R_{DOA} + N_0 I_{K_a}] \otimes \tilde{\underline{R}}$$

$$\approx [R_{DOA} + N_0 I_{K_a}] \otimes I_L$$

In Equation (26), a matrix $\underline{n}$ denotes interference power, and is defined by Equation (26) itself. Because the matrix $\underline{n}$ is substantially equal to the vector $\underline{r}_{u,v}$, $R_{DOA}$ becomes a Hermitian matrix in which diagonal elements are equal to each other. Therefore, if only the upper and lower triangular elements of $R_{DOA}$ are estimated, all of the remaining elements can be determined.

According to Equation (25) and Equation (26), it can be understood that a $K_a \times K_a$ matrix $R_{DOA}$ is associated with only DOAs and interference power of $K_i$ interferences. Assuming herein that there is no spatial correlation between interference signals of different antenna elements, an interference signal between the different antenna elements becomes 0. Therefore, $R_{DOA}$ can be determined using only the $k_i^{th}$ interference power $(\sigma^{(k_i)})^2$ and the spectral noise density $N_0$, and the total noise power $\underline{R}_n$ is calculated by the $R_{DOA}$.

A spatial channel impulse response vector $\underline{h}_d$ is estimated by Equation (27) using the total noise power $\underline{R}_n$ calculated by Equation (26).

$$\hat{\underline{h}}_d = (\underline{A}_s^H (I_{K_a} \underline{G}^H) \underline{R}_n^{-1} (I_{K_a} \underline{G}^H) \underline{A}_s)^{-1} \underline{A}_s^H (I_{K_a} \underline{G}^H) \underline{R}_n^{-1} \underline{e} \quad (27)$$

where '^(hat)' denotes an estimated value.

As a result, the total combined reception vector of an array antenna having $LK_a$ antenna elements is $$\underline{e} = (\underline{e}^{(1)T}, \underline{e}^{(2)T}, \ldots, \underline{e}^{(K_a)T})^T \quad (28)$$

$$= \begin{pmatrix} \underline{e}^{(1)} \\ \underline{e}^{(2)} \\ M \\ \underline{e}^{(K_a)} \end{pmatrix}$$

$$= \begin{pmatrix} G\underline{h}^{(1)} \\ G\underline{h}^{(2)} \\ M \\ G\underline{h}^{(K_a)} \end{pmatrix} + \begin{pmatrix} \underline{n}^{(1)} \\ \underline{n}^{(2)} \\ M \\ \underline{n}^{(K_a)} \end{pmatrix}$$

$$= (I_{K_a} \otimes G)\underline{h} + \underline{n}$$

$$\underline{e} = (I_{K_a} \otimes G)\underline{A}_s \underline{h}_d + \underline{n}$$

Finally, a receiver selects a row having the maximum size, i.e., a signal of a corresponding antenna element, from the combined reception signal vector of Equation (28).

As described above, multiple calculation processes are needed to acquire a designed signal through beam forming. Among the processes, DOA estimation has the larger proportion. The receiver evaluates signal characteristics for all directions of 0 to 360° each time, and regards a direction having a peak value as a DOA. Because this process requires so many calculations, research is being performed on several schemes for simplifying the DOA estimation.

An effect of beam forming according to estimation performance of DOAs will be described below.

Figure 3:
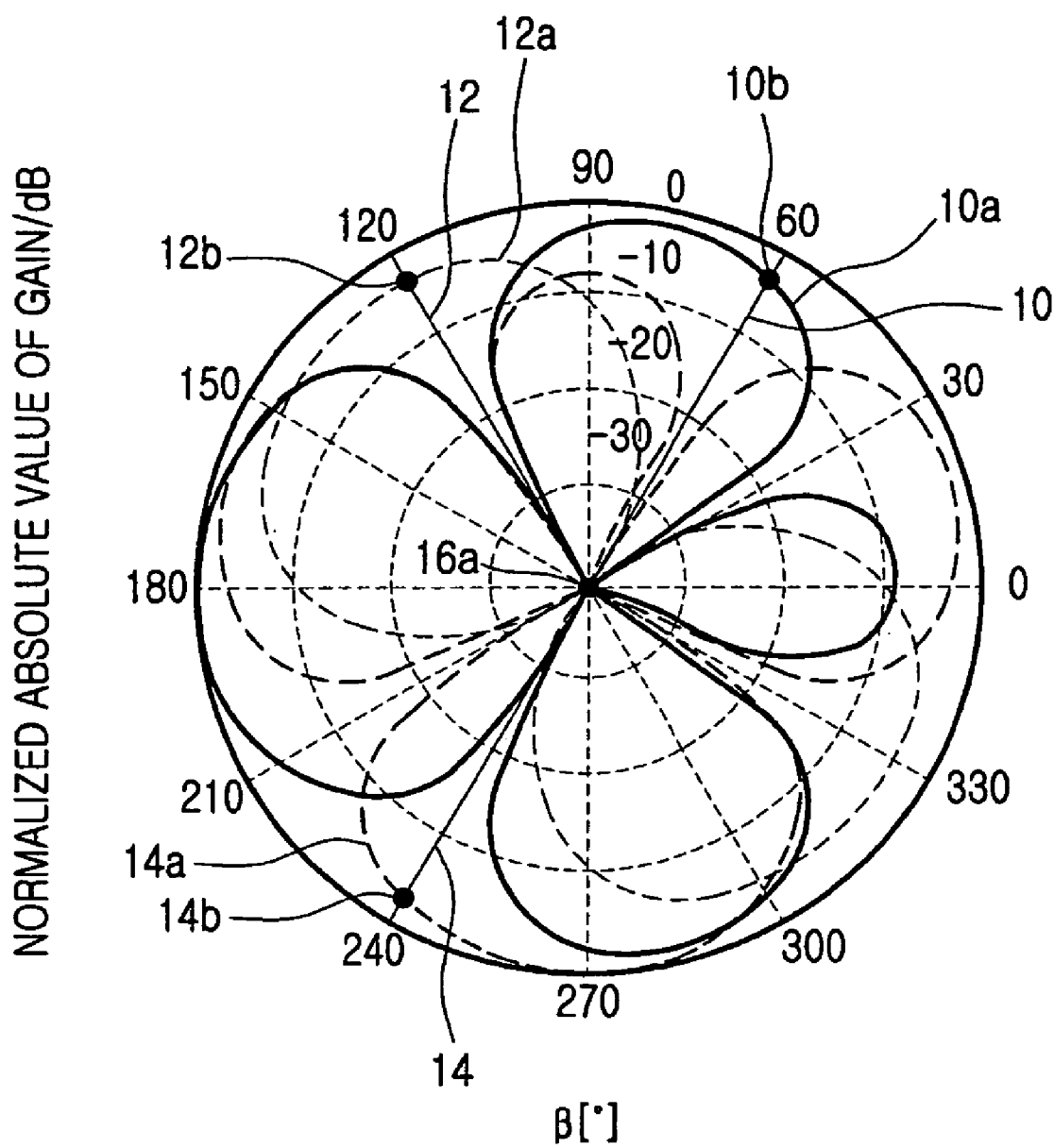
FIG. 3 is a polar plot illustrating spatial characteristics for the conventional null steering beam forming.

FIG. 3 is a polar plot illustrating spatial characteristics for the conventional null steering beam forming based on a Uniform Circular Array (UCA) having 4 antenna elements and an antenna element spacing $d_{element} = \lambda/2$ (where $\lambda$ denotes a wavelength for the center frequency of a corresponding frequency band), for 3 incident waves having DOAs of 60°, 120° and 240° in the same frequency band. That is, FIG. 3 illustrates the case where DOAs of spatial signals are fully known to a beam former and ideal beam forming is possible.

Referring to FIG. 3, solid lines represented by reference numerals 10, 12 and 14 indicate incident waves. Assuming that the incident wave 10 at a DOA of 60° is an effective signal and the other two incident waves 12 and 14 are interference signals, a first spatial characteristic represented by reference numeral 10a is acquired and a gain of the 60°-incident wave 10 is represented by reference numeral 10b. Assuming that the incident wave 12 at a DOA of 120° is an effective signal and the other two incident waves 10 and 14 are interference signals, a second spatial characteristic represented by reference numeral 12a is acquired and a gain of the 120°-incident wave 12 is represented by reference numeral 12b. Finally, assuming that the incident wave 14 at a DOA of 240° is an effective signal and the other two incident waves 10 and 12 are interference signals, a third spatial characteristic represented by reference numeral 14a is acquired and a gain of the 240°-incident wave 14 is represented by reference numeral 14b.

As described above, the null steering beam forming provides spatial diversity as it can separate 3 incident waves. This is possible on the assumption that DOA estimation is perfect and beam forming perfectly receives only individual signals. However, in an actual scenario where several hundreds of incident waves are used, the perfect DOA estimation is impossible and effective energy is reduced due to interference signals, making it difficult to obtain advantages of the null steering beam forming design. In particular, perfect separation of incident waves is actually impossible.

Figure 4:
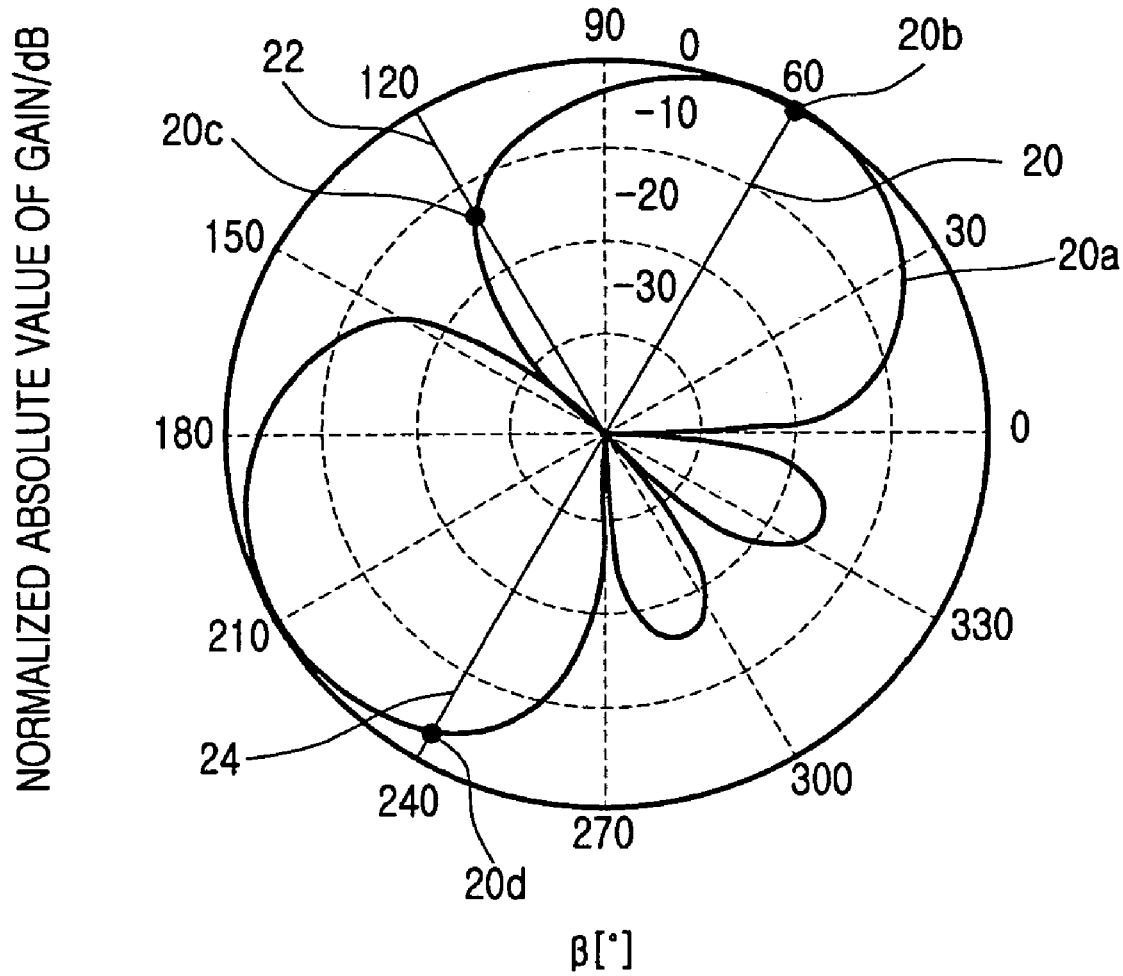
FIG. 4 is a polar plot illustrating spatial characteristics for the conventional beam forming that performs irregular spatial matching filtering, which maximizes received energy in the case of additive white Gaussian noise (AWGN)

FIG. 4 is a polar plot illustrating spatial characteristics for the conventional beam forming that performs spatial matching filtering, which maximizes received energy in the case of additive white Gaussian noise (AWGN), based on the UCA antenna having 4 antenna elements and an antenna element spacing $d_{element} = \lambda/2$, for 3 incident waves having DOAs of 60°, 120° and 240° in the same frequency band.

FIG. 4 illustrates only a spatial characteristic 20a for a 60°-incident wave 20, and its gain is represented by reference numeral 20b. The spatial characteristic 20a provides gains 20c and 20d not only for the 60°-incident wave 20 but also the other incident waves 22 and 24. As described above, the actual beam forming cannot perfectly separate 3 incident waves. When DOAs estimated in the receiver are perfectively accurate, there is mutual spatial interference. Fortunately, however, the effective energy remains.

Therefore, an embodiment of the present invention provides a novel simplified joint spatial and temporal channel and DOA estimation scheme. The foregoing conventional solution is considered to develop irregular spatial sampling according to the estimated DOAs. However, as described above, the irregular sampling is more complex than the regular sampling in implementation. Therefore, the embodiment of the present invention replaces the irregular spatial sampling with the regular sampling technique. This is implemented by using a predetermined number of fixed values instead of estimating DOAs in beam forming. A basic concept of the present invention and its mathematical description will be introduced below. In addition, the simulation results appropriate for the spatial scenario will be presented to support implementation possibility of the proposed method.

An array antenna that forms beams in several directions represented by DOAs can be construed as a spatial low-pass filter that passes the signals of only a corresponding direction. The minimum spatial sampling frequency is given by the maximum spatial bandwidth Bs of a beam former. For a single unidirectional antenna, $Bs=1/(2\pi)$.

If a spatially periodic low-pass filter characteristic is taken into consideration using given DOAs, regular spatial sampling with a finite number of spatial samples is possible. Essentially, the number of DOAs, representing the number of spatial samples, i.e., the number of resolvable beams, is given by a fixed value $N_b$. Selection of the $N_b$ depends upon the array geometry. In the case of the UCA antenna where antenna elements are arranged on a circular basis, the $N_b$ is simply selected such that it should be equal to the number of antenna elements. In the case of another array geometry, i.e., Uniform Linear Array (ULA), the $N_b$ is determined by Equation (29) so that the possible maximum spatial bandwidth determined for all possible scenarios can be taken into consideration.

$$N_b = \lceil 2\pi B_s \rceil \quad (29)$$

In Equation (29), '$\lceil \cdot \rceil$' denotes a ceiling function for calculating the maximum integer not exceeding an input value. For example, assuming that the possible maximum spatial bandwidth is $Bs=12/(2\pi)$, there are $N_b=12$ beams.

In the case where the number of directions, $K_d^{(k)}$ ($k=1, \ldots, K$), is fixed and the regular spatial sampling is implemented according to the present invention, the number $K_d^{(k)}$ of directions is equal to the number $N_b$ of DOAs. Accordingly, in the receiver, a wave transmitted by a user #k affects the antenna array in the $N_b$ different directions. As described above, the directions are represented by cardinal identifiers $k_d$ ($k_d=1, \ldots, Nb$), and angles $\beta^{(k,k_d)}$ associated with DOAs is taken from a finite set defined as $$B = \left\{ \beta_0, \beta_0 + \frac{2\pi}{N_b}, \beta_0 + 2\frac{2\pi}{N_b} L\beta_0 + (N_b - 1)\frac{2\pi}{N_b} \right\}. \quad (30)$$

In Equation (30), $\beta_0$ denotes a randomly-selected fixed zero phase angle, and is preferably set to a value between 0 and $\pi/N_b$ [radian]. In the foregoing example where $N_b=12$ beams and $\beta_0=0$ are used, Equation (30) calculates Equation (31) below corresponding to a set of angles including 0°, 30°, 60°, . . . , 330°.

$$B = \left\{ 0, \frac{\pi}{6}, 2\frac{\pi}{6}, \ldots, 11\frac{\pi}{6} \right\} \quad (31)$$

When the set B of Equation (30) is selected, the possible different values of $\beta^{(k,k_d)}$ are the same for all users $k=1, \ldots, K$. The values are previously known to the receiver. Therefore, the receiver no longer requires the DOA estimation.

Assuming that there are $K_i=N_b$ interferences, implementation of angle domain sampling will be described below. Because all the possible values of Equation (30) are acquired by $\beta^{(k,k_d)}$ and $\gamma^{(k_i)}$, the $\beta^{(k,k_d)}$ and $\gamma^{(k_i)}$ are selected by Equation (32) and Equation (33), respectively.

$$\beta^{(k,k_d)} = \beta^{(k_d)} = \beta_0 + 2\frac{\pi}{N_b}(k_d - 1), \quad k = 1 \ldots K, \quad k_d = 1 \ldots N_b \quad (32)$$

$$\gamma^{(k_i)} = \beta_0 + 2\frac{\pi}{N_b}(k_i - 1), \quad k_i = 1 \ldots N_b \quad (33)$$

From the $\beta^{(k,k_d)}$ and $\gamma^{(k_i)}$, a phase factor of a $k_d^{th}$ spatial signal which is incident upon a $k_a^{th}$ antenna element ($k_a=1, \ldots, K_a$) from a $k^{th}$ user, and a phase factor of a $k_i^{th}$ interference signal which is incident upon the $k_a^{th}$ antenna element are simply calculated by Equation (34).

$$\Psi(k, k_a, k_d) = \Psi(k_a, k_d) = 2\pi \frac{l^{(k_a)}}{\lambda} \cdot \cos(\beta^{(k_d)} - \alpha^{(k_a)}),$$

$$\Phi(k_i, k_a) = \Phi(k_d, k_a) = 2\pi \frac{l^{(k_a)}}{\lambda} \cdot \cos(\gamma^{(k_d)} - \alpha^{(k_a)}), \quad (34)$$

$$k_i = k_d = 1 \ldots N_b, \quad k_a = 1 \ldots K_a, \quad k = 1 \ldots K$$

Herein, an angle $\alpha^{(k_a)}$ and a distance $l^{(k_a)}$ are fixed by the geometry of the array antenna.

The number of columns in the $\underline{A}_s$ defined in Equation (12) is $K \cdot W \cdot K_d^{(k)}$. However, if Equation (30) and Equation (34) are used, the number of columns is fixed, simplifying signal processing.

Figure 5:
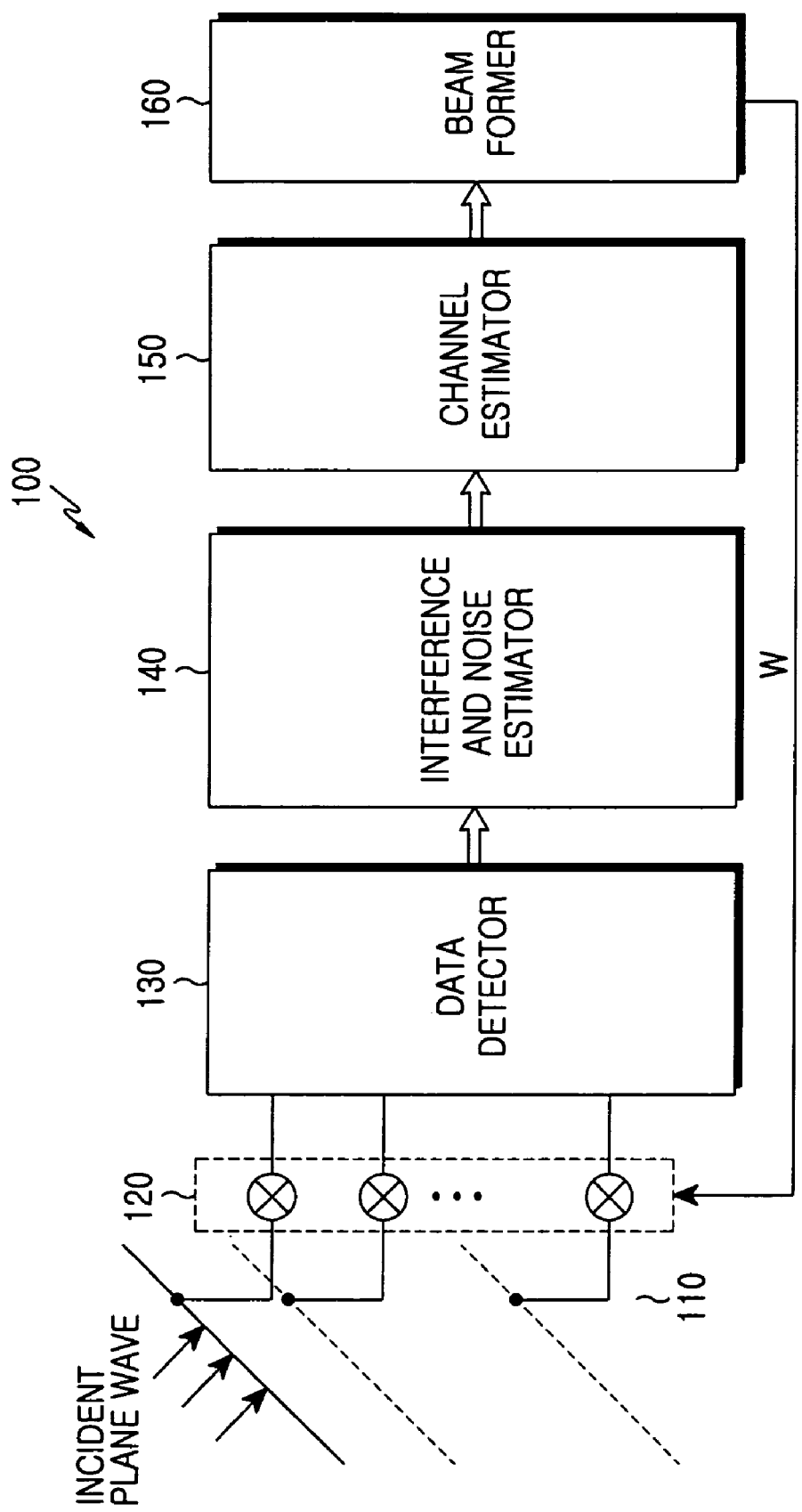
FIG. 5 is a block diagram illustrating a structure of a receiver in an array antenna system according to an embodiment of the present invention.
Figure 6:
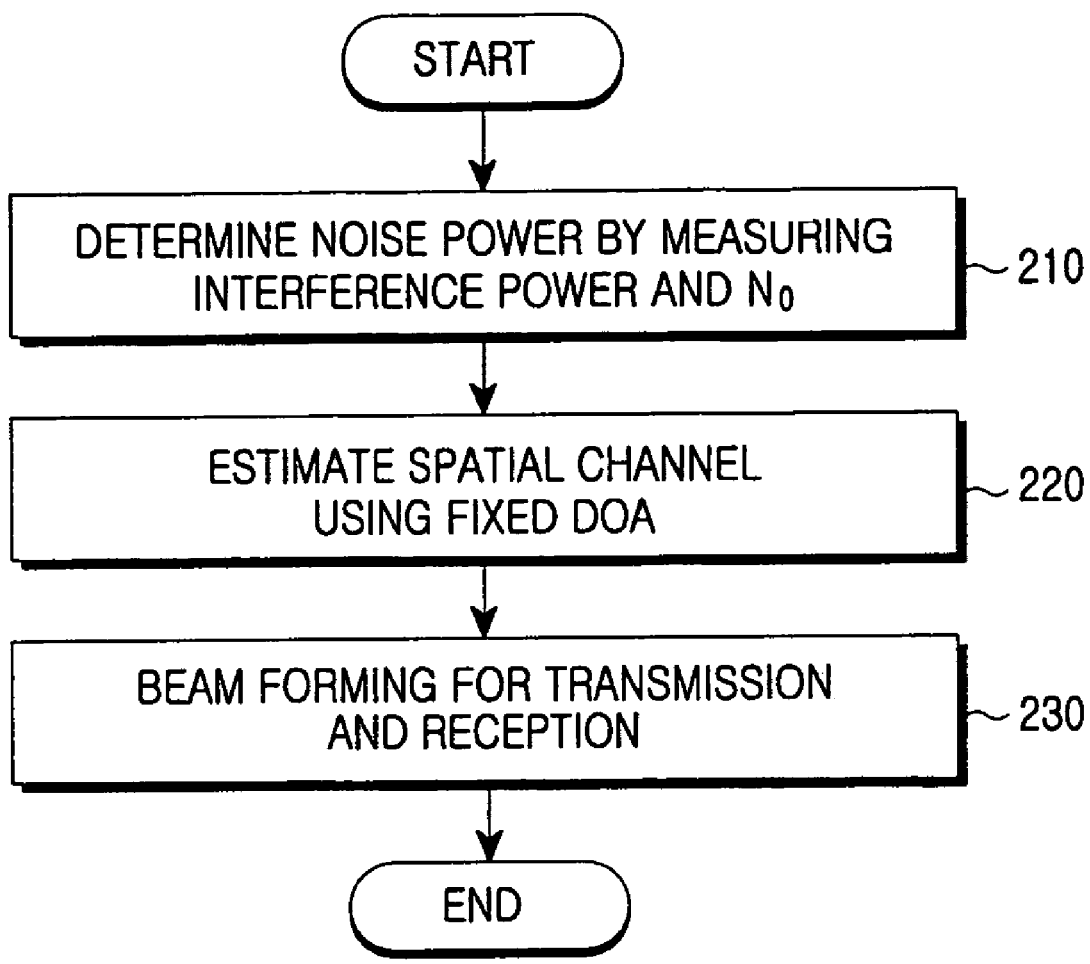
FIG. 6 is a flowchart illustrating a joint channel and DOA estimation operation according to an embodiment of the present invention.

FIG. 5 illustrates a structure of a receiver 100 in an array antenna system according to an embodiment of the present invention, and FIG. 6 is a flowchart illustrating operations of the interference and noise estimator 140, the channel estimator 150 and the beam former 160 in the receiver 100. An embodiment of the present invention will now be described with reference to FIGS. 5 and 6.

Referring to FIG. 5, an antenna 110 is an array antenna having antenna elements in predetermined array geometry, and receives a plurality of spatial signals which are incident thereupon through spaces. By way of example, it is shown in FIG. 5 that an incident plane wave from only one direction is received at each of the antenna elements with a different phase. Each of multipliers 120 multiplies its associated antenna element by a weight for the corresponding antenna element, determined by the beam former 160. A data detector 130 performs frequency down-conversion, demodulation, and channel selection on the outputs of the antenna elements, to which the weights were applied, thereby detecting a digital data signal.

Referring to FIG. 6, in step 210, the interference and noise estimator 140 estimates interference power $\underline{R}_{DOA}$ and a spectral noise density $N_0$ of thermal noise power using data signals provided from the data detector 130. A noise power $\underline{R}_n$ which is a covariance matrix of a combined noise vector $\underline{n}$ is calculated using the estimated interference power and spectral noise density. At the initial beam forming, because there is no data signal received, the interference power $\underline{R}_{DOA}$ is initialized to $I_k$ to calculate the noise power $\underline{R}_n$.

An example of estimating the spectral noise power density $N_0$ is as follows:

1. Switch off all reception antennas.
2. Sample the complex baseband nose signal prevailing at each analog reception branch.

3. Determine the variance of the complex baseband noise sequence. The variance is identical to $N_0$.

Another method is given by measurement of an absolute receiver temperature T. It is found that $N_0=Fk_BT$, where F denotes a linear noise figure being dependent upon a type of antenna, $k_B$ denotes Boltzman's constant and T denotes the absolute receiver temperature.

Next, the interference power is estimated in the following method. Referring to Equation (26) and assuming that there is no correlation between interference signals, only the diagonal elements are required for estimation of the $\underline{R}_{DOA}$. Assuming that $K_i=K_d$, power $(\sigma^{(k_i)})^2$ of a $k_i^{th}$ interference signal can be obviously determined. Therefore, the diagonal elements become the values determined by normalizing energies for a maximum of Z interference signals among $K_i$ interference signals arriving at a $k_a^{th}$ antenna element, into Z as shown in Equation (35).

$$[\hat{R}_{DOA}]_{k_i,k_i} = \frac{1}{Z}\sum_{z=1}^{Z}\|\hat{n}_{w,d}^{(k_a,z)}\|^2 \approx (\sigma^{(k_i)})^2 + N_0 \qquad (35)$$

In Equation (35), $\underline{n}_{w,d}^{(k_a,z)}$ is a vector representing a $z^{th}$ noise signal estimated at a $k_a^{th}$ antenna, and Z is an integer selected from a group of values smaller than $K_i$. The value Z is given to use a less number Z of interference signals instead of estimating all of $K_i$ interference signals, thereby reducing the number of calculations. However, as shown in Equation (35), the diagonal elements of the interference power are determined according to power of a $k_i^{th}$ interference signal regardless of the Z.

In step 220, the channel estimator 150 calculates a phase matrix $\underline{A}_s$ by a predetermined number $N_b$ of DOA values, calculates a directional channel impulse response vector $\underline{h}_d$ using Equation (36), and thereafter, calculates a combined channel impulse response vector using Equation (13).

$$\underline{h}_d = (\underline{A}_s^H(I_{K_a}\underline{G}^H)\underline{R}_n^{-1}(I_{K_a}\underline{G}^H)\underline{A}_s)^{-1}\underline{A}_s^H(I_{K_a}\underline{G}^H)\underline{R}_n^{-1}\underline{e} \qquad (36)$$

Herein, a matrix $\underline{G}$ indicating a mid-amble sequence is a value predefined between a transmitter and a receiver, and $\underline{e}$ is a combined reception vector calculated by Equation (28).

In step 230, the beam former 160 calculates steering vectors by performing adaptive beam forming on all directions for each antenna element using the calculated combined channel impulse response vector $\underline{h}$. Thereafter, the beam former 160 performs beam forming on the estimated DOAs of the incident wave using the combined channel impulse response vector and the steering vectors.

Performance of the present invention will now be analyzed below. A synthetic scenario used in the following analysis considers only 8 scatters, termed "8-path test channel." A channel environment for the synthetic scenario is illustrated in FIG. 7.

Figure 7:
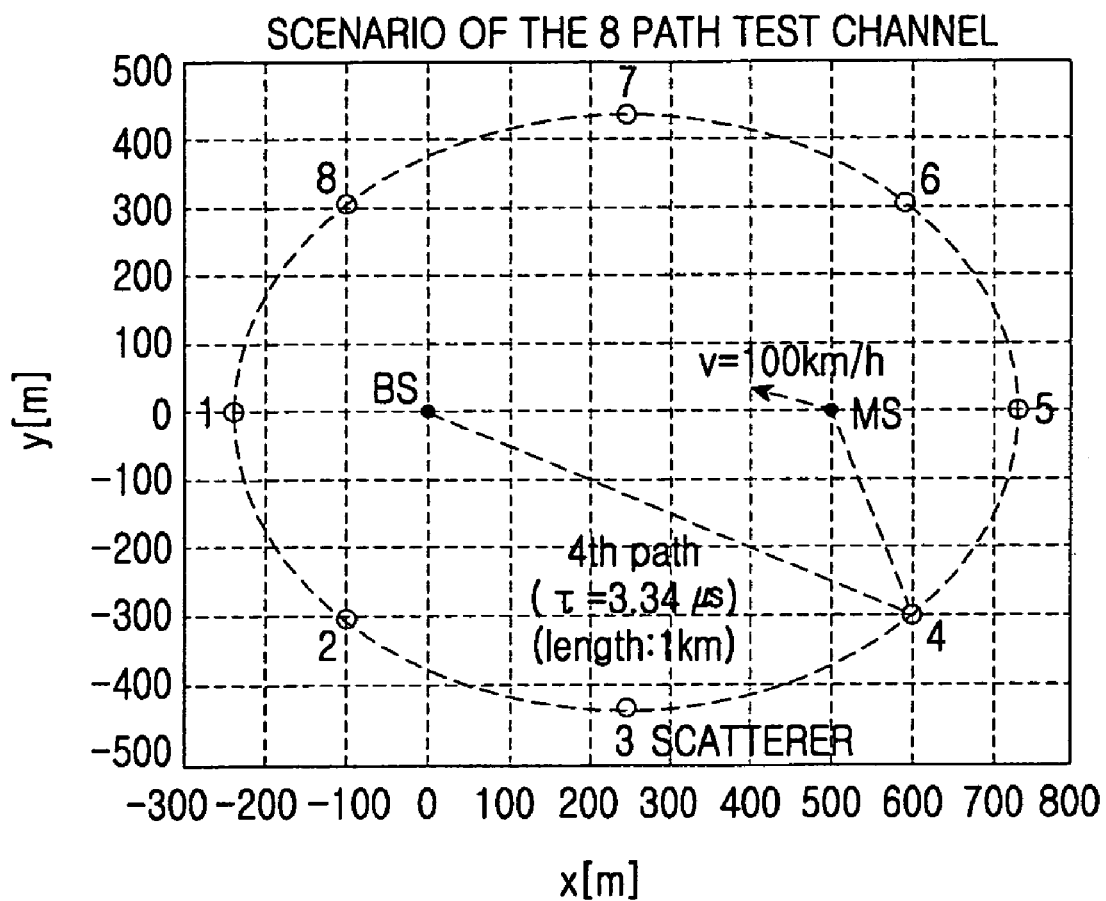
FIG. 7 is a diagram for a description of a synthetic scenario for an 8-path test channel according to an embodiment of the present invention.

Referring to FIG. 7, a base station and a mobile station maintains a distance of 500 m, and a signal from the base station arrives at the mobile station passing through 8 paths given by 8 reflecting points denoted by small circles. All of the 8 paths have the same length of 1 Km, corresponding to a delay of approximately 3.34 μs. A moving velocity of the mobile station is assumed to be 100 Km/h.

Figure 8:
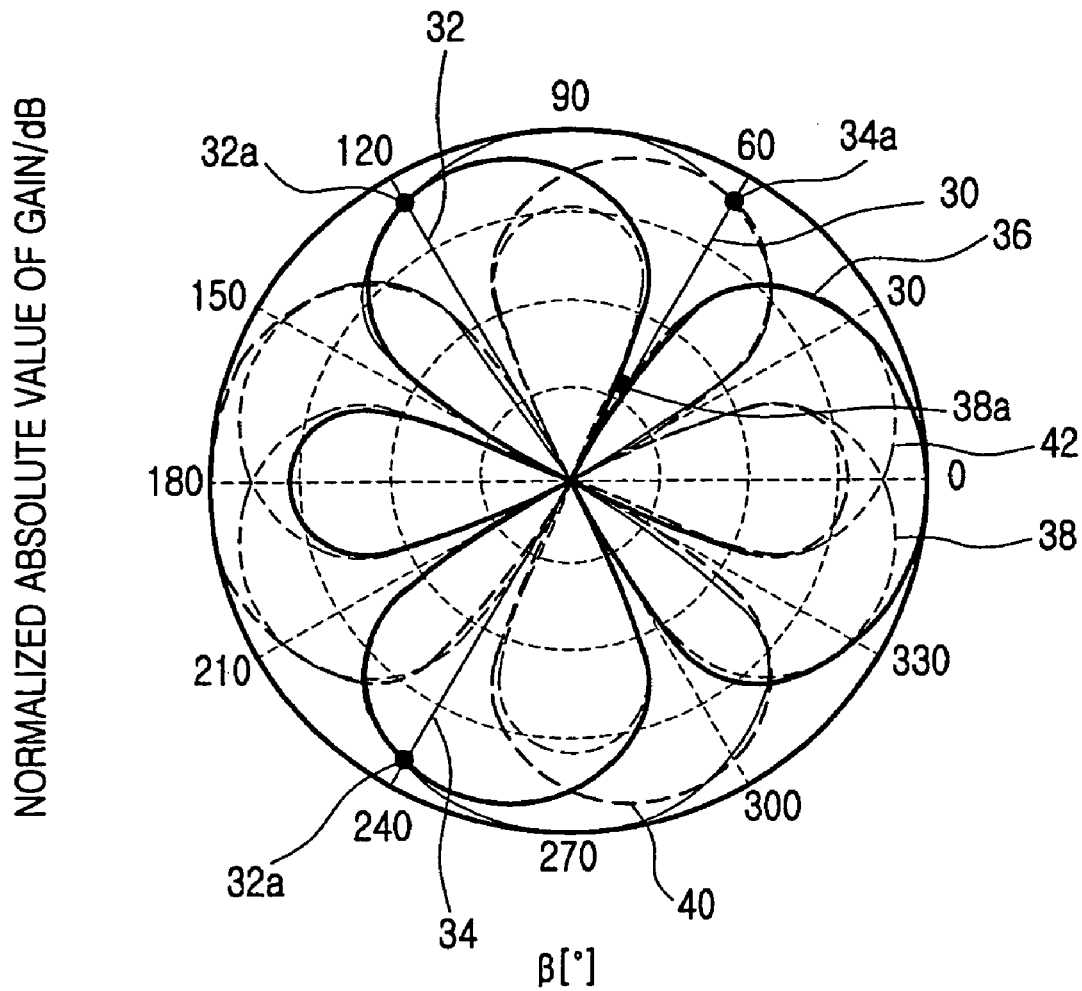
FIG. 8 is a polar plot illustrating spatial characteristics for regular spatial sampling according to an embodiment of the present invention.

FIG. 8 is a polar plot illustrating spatial characteristics for beam forming where the novel regular spatial sampling is applied to the synthetic scenario. The mobile station forms 4 regularly spaced beams with center angles 0°, 90°, 180°and 270°, for an uniform circular array (UCA) antenna with 4 antenna elements and antenna element spacing $d_{element}=\lambda/2$ (where $\lambda$ is a wavelength for the center frequency of a corresponding frequency band) in the same frequency band. Spatial characteristics of the beams are denoted by reference numerals 36, 38, 40 and 42. DOAs of actually received incident waves are 60°, 120° and 240°, and they are denoted by reference numerals 30, 32 and 34.

As illustrated in FIG. 8, it can be noted that the spatial characteristics 36, 38, 40 and 42 of the beams formed using the fixed DOAs provide relatively higher gains compared with the actual incident waves 30, 32 and 34.

A fading effect occurring in FIG. 8 because of imperfect separation of the incident waves can be reduced by increasing a spatial bandwidth of a spatial filter, for example, by increasing the number of antenna elements. The increase in number of antenna elements means an increase in capability of detecting paths in a broadband system.

Figure 9:
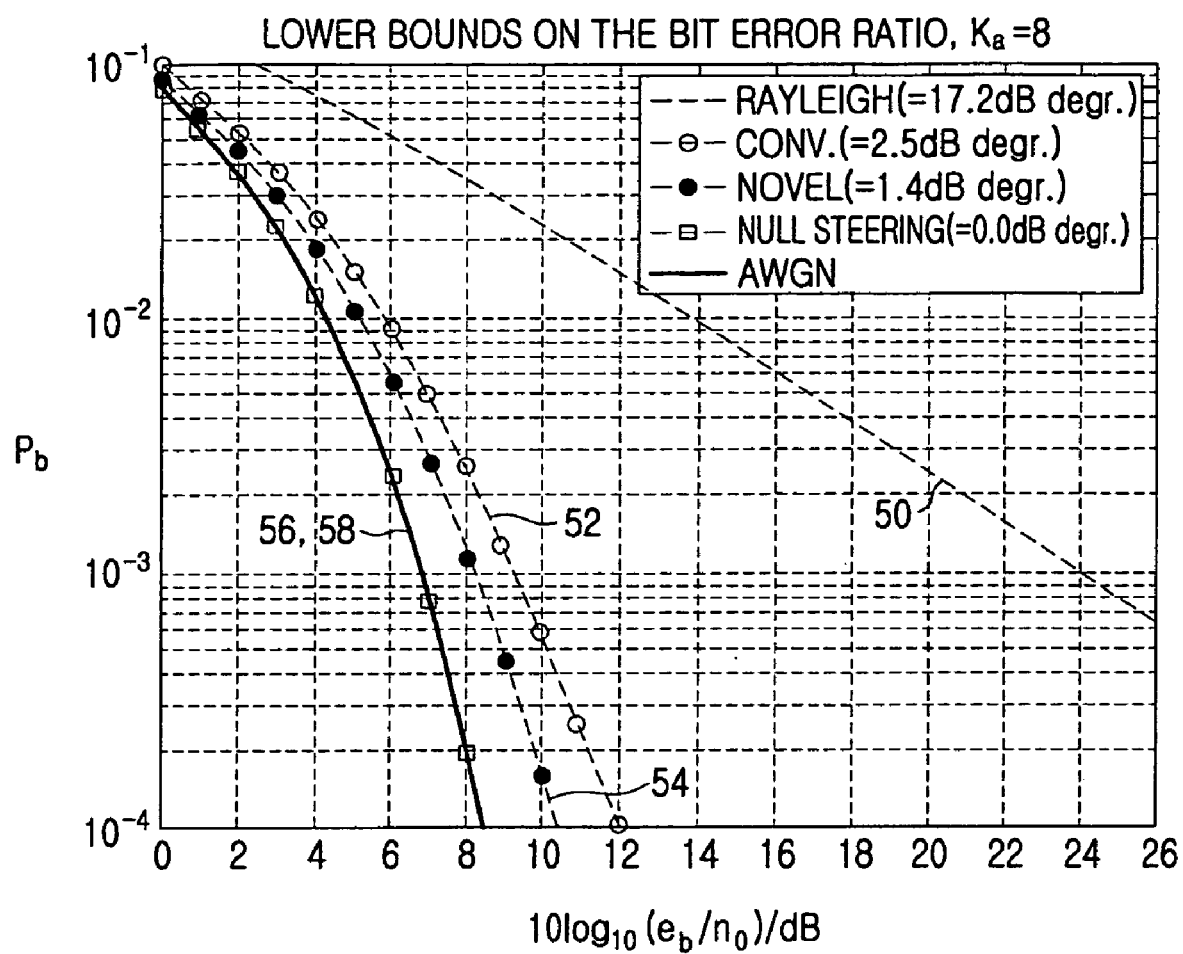
FIG. 9 is a diagram illustrating performance acquired for the synthetic scenario of the 8-path test channel according to an embodiment of the present invention.

FIG. 9 illustrates performances on a signal-to-noise ratio $e_b/n_0$ acquired for the synthetic scenario of the 8-path test channel, illustrated in FIG. 7. It is assumed in FIG. 9 that a beam former has a maximum spatial bandwidth of $B_s=8/(2\pi) \approx 0.222°$, the number of antenna elements is $K_a=8$ and the number of users is 1. The performance illustrated herein is the best bit error ratio (BER) that can be acquired using a receiver in spatial channel models of the Rayleigh fading environment 50, the conventional technology 52, the novel technology 54 used in accordance with an embodiment of the present invention, the null steering environment 56 and the AWGN environment 58.

Referring to FIG. 9, the performance of the novel technology 54, which is associated with the number $K_a$ of antenna elements, approaches the performance of the AWGN environment 58, compared with the performance of the conventional technology 52. If $K_a$ is granter than or equal to 8, the novel technology is higher by approximately 0.5 dB than the conventional technology in terms of performance.

The foregoing embodiment aims at the optimal combining (maximum ratio combining) of various beams received at the array antenna. Unlike this, the fixed beam switching uses a set of fixed beams of equal width which span the whole 360° plane. In beam switching, only a particular beam in a desired direction rather than two or more beams is switched to transmit the energy of the particular beam to the user. A description will now be made of another embodiment of the present invention in which the foregoing embodiment is applied to the beam switching scenario.

Figure 10:
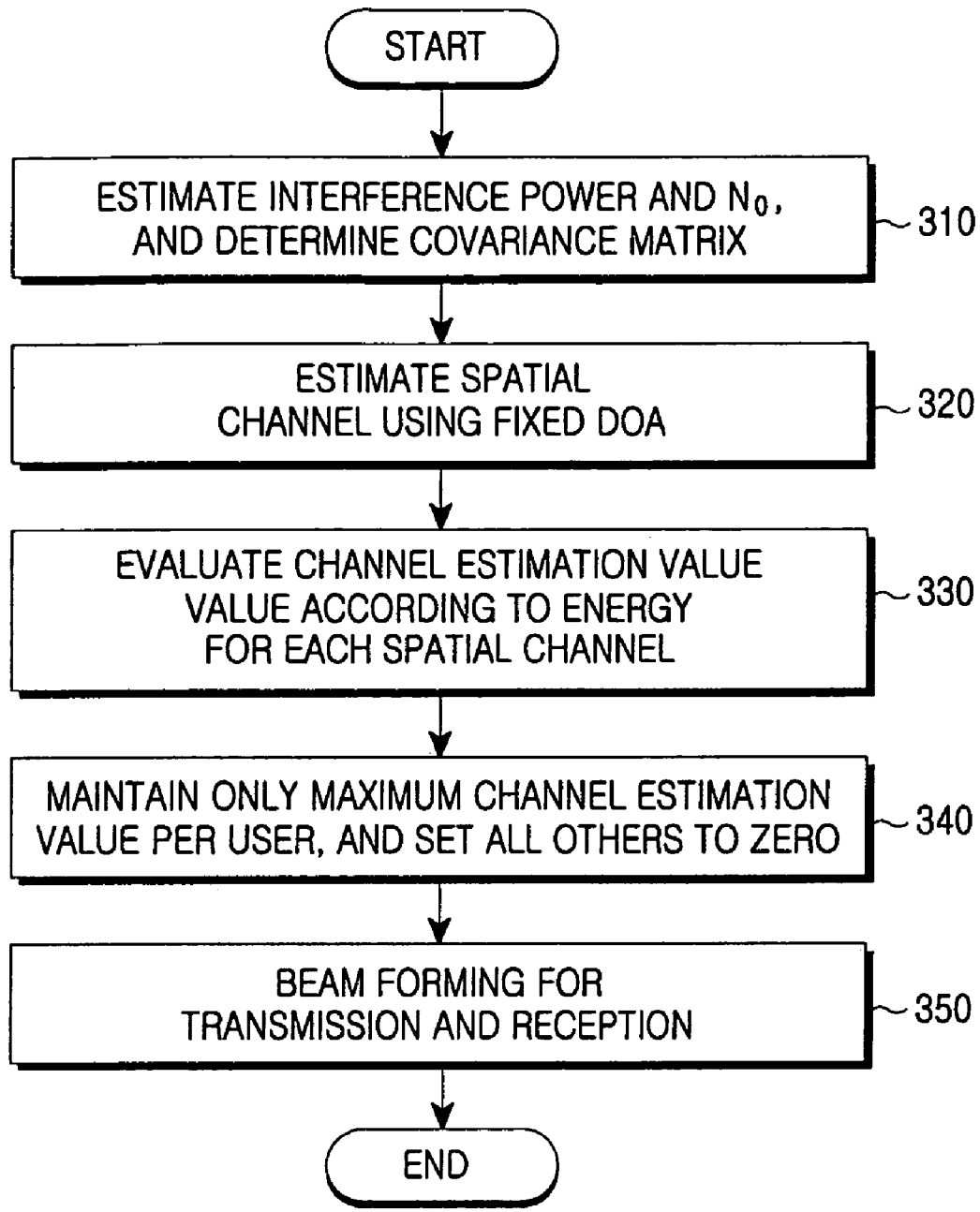
FIG. 10 is a flowchart illustrating a beam forming operation according to another embodiment of the present invention.

FIG. 10 is a flowchart illustrating a beam forming operation according to another embodiment of the present invention. The beam forming operation described below can be performed by the receiver of FIG. 5.

Referring to FIG. 10, in step 310, the interference and noise estimator 140 calculates a covariance matrix representing a noise power using estimated interference power and spectral noise density $N_0$. In step 320, the channel estimator 150 calculates a directional channel impulse response vector of Equation (36) using the noise power. The directional channel impulse response vector, for which all of $N_b$ directions for all of K users are taken into consideration, is expressed as $$\underline{h}_d = (\underline{h}_d^{(1,1)T}, \underline{h}_d^{(1,2)T}, \ldots \underline{h}_d^{(1,N_b)T}, \ldots \underline{h}_d^{(K,1)T}, \underline{h}_d^{(K,2)T}, \ldots \underline{h}_d^{(K,N_b)T})^T \qquad (37)$$

In step 330, the channel estimator 150 evaluates channel estimated values for the directional channel impulse response vector of Equation (37) using the energy for each antenna element and each direction, and ranks energies ∥

$\underline{h}_d^{(k,k_d)}\|^2$ of the directional channel impulse responses estimated in association with each direction $k_d$ in order of their size for each of all the K users.

In step 340, the channel estimator 150 selects only one direction having the maximum channel impulse response energy for each user, maintains only a channel impulse response energy of the selected direction and sets energies of all other channel impulse responses to zero, forming a modified directional channel impulse response $\underline{h}_{d,mod}$. The modified directional channel impulse response, together with the phase matrix $\underline{A}_s$ generated using the fixed DOA values, are used for calculating a final combined channel impulse response $\underline{h}$.

In step 350, the beam former 160 detects only one direction for each user for each antenna element by performing beam forming using the calculated combined channel impulse response. That is, for the combined channel impulse response, only one direction is taken into consideration for each user, making it possible to detect only a signal in a desired direction.

The alternative embodiment illustrated in FIG. 10 reduces the number of channel impulse response estimation values taken into consideration for beam forming for each user, simplifying signal processing.

As can be understood from the foregoing description, the novel beam former performs regular spatial sampling instead of estimating DOAs needed for determining weights, thereby omitting the processes needed for estimating DOAs without considerably deteriorating the beam forming performance.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A beam forming apparatus for an antenna diversity system with an array antenna having a plurality of antenna elements, the apparatus comprising:
   an interference and noise calculator for estimating interference power $\underline{R}_{DOA}$ and spectral noise density $N_0$ of a radio channel using a signal received through the radio channel, and calculating total noise power of the radio channel according to the interference power and the spectral noise density;
   a channel estimator for calculating a phase matrix including phase factors associated with a predetermined number of direction-of-arrival (DOA) values and a directional channel impulse response matrix using the total noise power, and calculating a combined channel impulse response by combining the phase matrix with the directional channel impulse response matrix; and
   a beam former for performing beam forming for transmission and reception through the array antenna using the combined channel impulse response.

2. The beam forming apparatus of claim 1, wherein the number of the DOA values is set to a maximum integer not exceeding a product ($2\pi B$) of a possible maximum spatial bandwidth (B) of the array antenna and a double circle ratio ($2\pi$).

3. The beam forming apparatus of claim 1, wherein the number of DOA values is equal to the number of the antenna elements comprising the array antenna when the array antenna has a uniform circular array (UCA) geometry.

4. The beam forming apparatus of claim 1, wherein each of the DOA values is determined by $$\beta^{(k_d)} = \beta_0 + \frac{2\pi}{N_b}(k_d - 1)$$

where $\beta^{(k_d)}$ denotes a DOA of a $k_d^{th}$ signal, $\beta_0$ denotes a randomly selected fixed zero-phase angle, $N_b$ denotes the number of the DOA values, and $k_d$ denotes a direction index which is an integer between 1 and the $N_b$.

5. The beam forming apparatus of claim 4, wherein the $\beta_0$ has a value between 0 and $\pi/N_b$ radian.

6. The beam forming apparatus of claim 1, wherein the interference power is expressed with a Hermitian matrix of which diagonal elements are defined in the following equation and the other elements are all zeros (0s), $$[\hat{R}_{DOA}]_{k_i k_i} = (\sigma^{(k_i)})^2 + N_0$$

where '$\hat{R}_{DOA}$' denotes the interference power, and $(\sigma^{(k_i)})^2$ denotes power of a $k_i^{th}$ interference signal, and $N_0$ denotes the spectral noise density.

7. The beam forming apparatus of claim 1, wherein the channel estimator evaluates channel estimation values of the directional channel impulse response for each direction for each user, calculates a modified directional channel impulse response by maintaining only a direction showing the maximum channel estimation value and setting channel estimation values for all the other directions to zero.

8. The beam forming apparatus of claim 1, wherein the beam former determines a spatial channel and a DOA of a desired optimal signal using the beam forming.

9. A beam forming method for an antenna diversity system with an array antenna having a plurality of antenna elements, the method comprising the steps of:
   estimating interference power $\underline{R}_{DOA}$ and spectral noise density $N_0$ of a radio channel using a signal received through the radio channel, and calculating total noise power of the radio channel according to the interference power and the spectral noise density;
   calculating a phase matrix including phase factors associated with a predetermined number of direction-of-arrival (DOA) values and a directional channel impulse response matrix using the total noise power, and calculating a combined channel impulse response by combining the phase matrix with the directional channel impulse response matrix; and performing beam forming for transmission and reception through the array antenna using the combined channel impulse response.

10. The beam forming method of claim 9, wherein the number of the DOA values is set to a maximum integer not exceeding a product ($2\pi B$) of a possible maximum spatial bandwidth (B) of the array antenna and a double circle ratio ($2\pi$).

11. The beam forming method of claim 9, wherein the number of DOA values is equal to the number of the antenna elements comprising the array antenna when the array antenna has a uniform circular array (UCA) geometry.

12. The beam forming method of claim 9, wherein each of the DOA values is determined by $$\beta^{(k_d)} = \beta_0 + \frac{2\pi}{N_b}(k_d - 1)$$

where $\beta^{(k_d)}$ denotes a DOA of a $k_d{}^{th}$ signal, $\beta_0$ denotes a randomly selected fixed zero-phase angle, $N_b$ denotes the number of the DOA values, and $k_d$ denotes a direction index which is an integer between 1 and the $N_b$.

13. The beam forming method of claim 12, wherein the $\beta_0$ has a value between 0 and $\pi/N_b$ radian.

14. The beam forming method of claim 9, wherein the interference power is expressed with a Hermitian matrix of which diagonal elements are defined in the following equation and the other elements are all zeros (0s), $$[\hat{R}_{DOA}]_{k_i,k_i} = (\sigma^{(k_i)})^2 + N_0$$

where '$\hat{R}_{DOA}$' denotes the interference power, and $(\sigma^{(k_i)})^2$ denotes power of a $k_i{}^{th}$ interference signal, and $N_0$ denotes the spectral noise density.

15. The beam forming method of claim 9, wherein the step of calculating a combined channel impulse response comprises the step of evaluating channel estimation values of the directional channel impulse response for each direction for each user, calculating a modified directional channel impulse response by maintaining only a direction showing the maximum channel estimation value and setting channel estimation values for all the other directions to zero.

16. The beam forming method of claim 9, further comprising the steps of determining a spatial channel and a DOA of a desired optimal signal using the beam forming.

* * * * *